United States Patent [19]
Fukumoto

[11] 4,362,143
[45] Dec. 7, 1982

[54] EXHAUST GAS SUPPRESSOR

[75] Inventor: Masafumi Fukumoto, Amagasaki, Japan

[73] Assignee: Nissin Jabara Industries Co., Ltd., Amagasaki, Japan

[21] Appl. No.: 257,344

[22] Filed: Apr. 24, 1981

[30] Foreign Application Priority Data

Jun. 2, 1980 [JP] Japan ................................ 55-74576

[51] Int. Cl.³ ........................................... F02M 23/14
[52] U.S. Cl. .................................. 123/556; 48/180 R; 48/180 S; 123/587
[58] Field of Search ............... 123/327, 556, 585–590; 48/180 A, 180 B, 180 H, 180 S

[56] References Cited

U.S. PATENT DOCUMENTS

| | | | |
|---|---|---|---|
| 2,789,796 | 4/1957 | Mansfield | 123/587 X |
| 3,244,424 | 12/1965 | Mennicken et al. | 123/586 |
| 3,645,509 | 2/1972 | Eckert et al. | 123/587 X |
| 3,659,575 | 5/1972 | Lukka | 123/587 X |
| 4,167,166 | 9/1979 | Varner et al. | 123/556 X |
| 4,274,386 | 6/1981 | Reyes | 123/590 X |

Primary Examiner—William A. Cuchlinski, Jr.
Attorney, Agent, or Firm—Gabriel P. Katona

[57] ABSTRACT

An exhaust gas suppressor which suppresses the generation of harmful gases contained in exhaust gases from internal combustion engines, wherein secondary air is efficiently heated to high temperature by a coiled heater tube installed in the exhaust manifold of the internal combustion engine and is added to a mixture of primary air and fuel present in the suction manifold, the mixture being then fed to an eddy generating device which generates eddies in the mixture for complete gasification.

6 Claims, 13 Drawing Figures

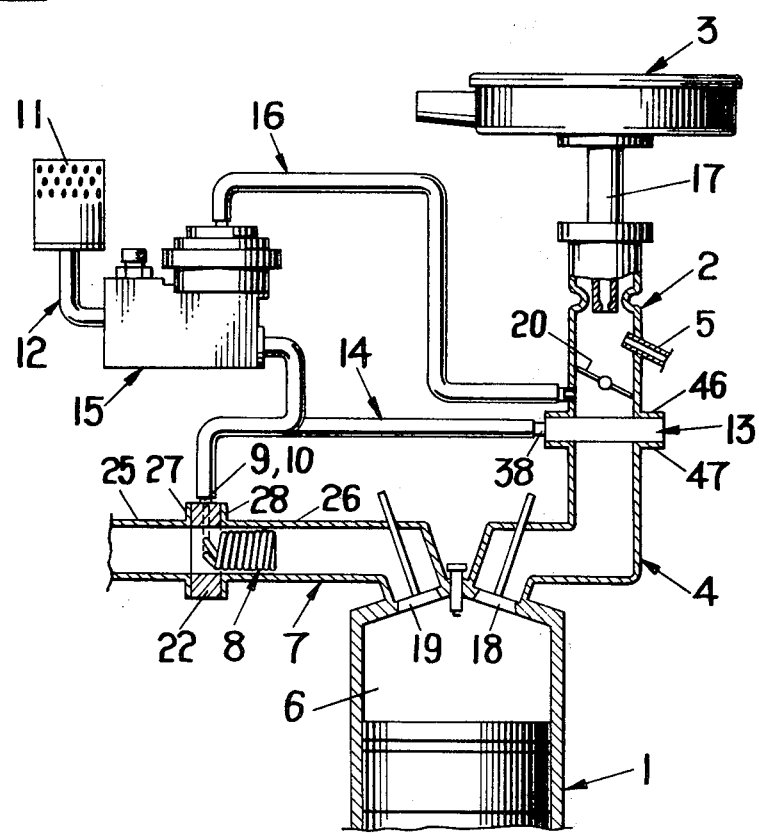

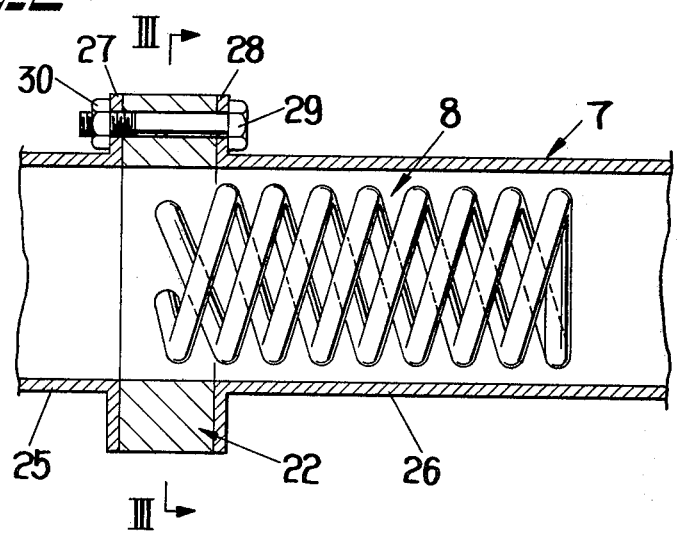
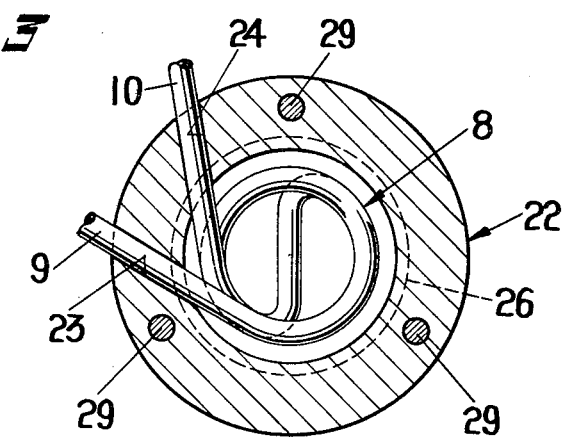
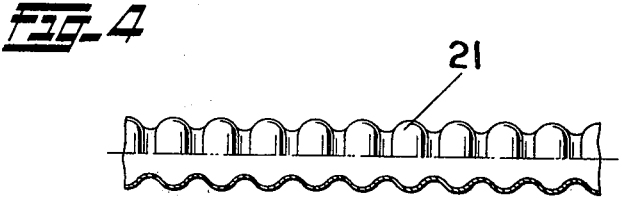

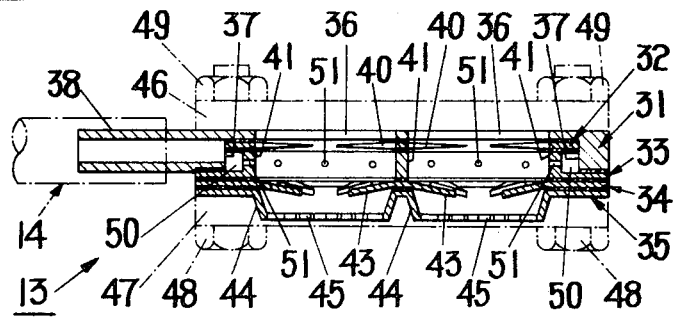
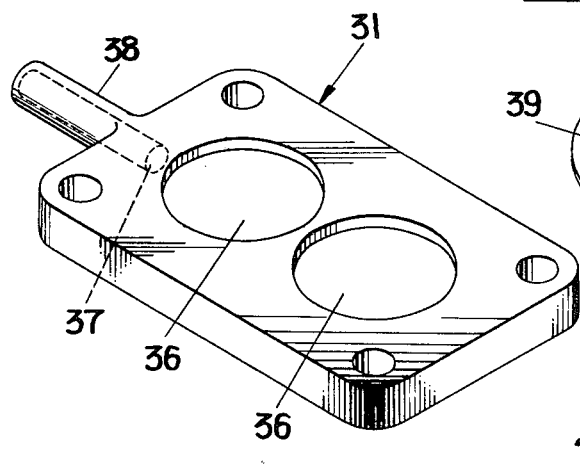
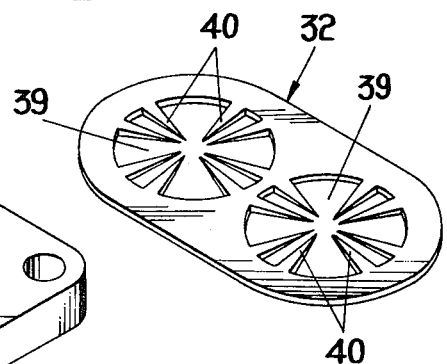
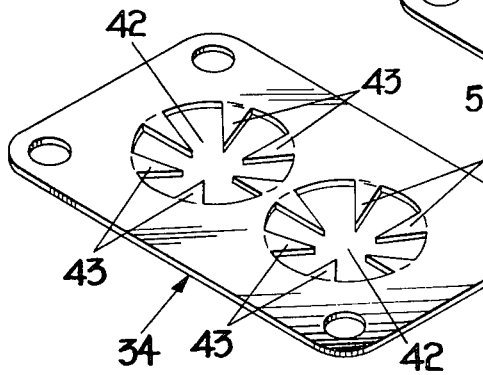
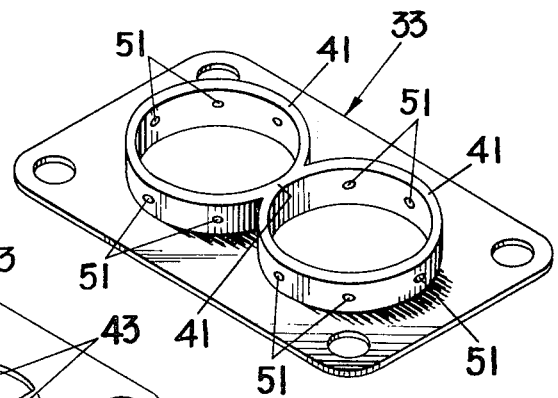

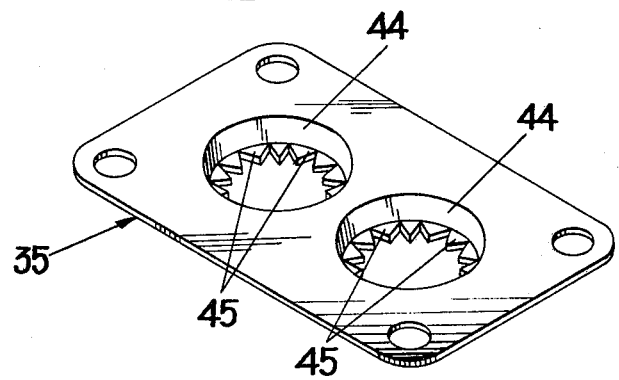
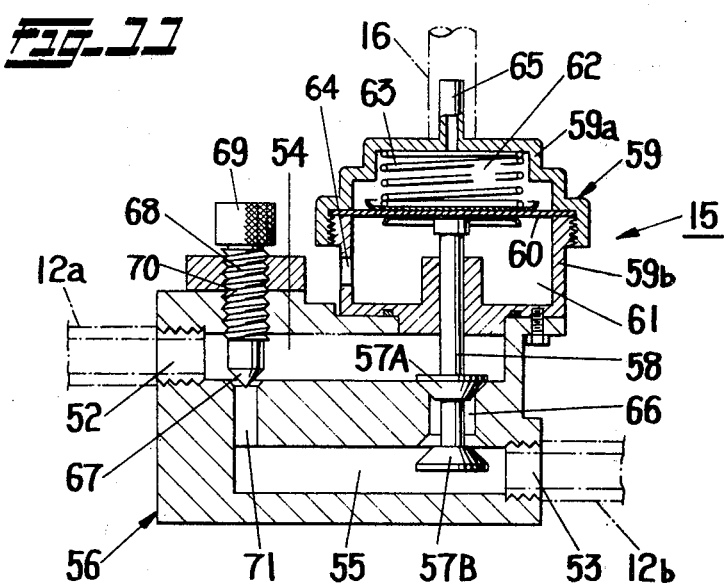

EXHAUST GAS SUPPRESSOR

BACKGROUND OF THE INVENTION

The present invention relates to an exhaust gas suppressor wherein secondary air heated inside the exhaust manifold of an internal combustion engine by the heat of exhaust gases from the engine is fed to the suction manifold downstream of the carburetor so as to prevent a mixture of primary air and fuel to be sucked into the combustion chamber from becoming too rich and assist in complete combustion of said mixture, thereby suppressing the generation of harmful gases contained in exhaust gases.

There have been various devices for suppressing the generation of harmful gases, and these devices may be classified into two types, namely, wet type and dry type. In the wet type, water or steam is injected into the suction manifold to lower the mixture explosion temperature by the heat of gasification of said water or steam, thereby suppressing the generation of nitrogen oxides ($NO_x$). This type, however, requires a tank for storing water and if such tank is relatively small, frequent supply of water to the tank must be made, while if it is large, a large space for the installation of the tank is required, thus limiting the application of the device. Moreover, when the engine temperature is low, especially at the start of engine operation, part of the water or steam injected into the suction manifold forms drops when injected into the combustion chamber, so that the distribution of air-fuel mixture in the case of a multicylinder engine is degraded. Further, such drops of water detract from the smoothness of engine operation during transition as when the engine is accelerating or decelerating. The wet type device should theoretically be worth noticing, but is is hardly practicable since it has many problems in practice, as described above.

On the other hand, the dry type device includes the so-called air injection type wherein secondary air which is not superheated is fed to the suction manifold so as to prevent the fuel which remains in the suction manifold from making too rich the air-fuel mixture to be fed to the combustion chamber. Thus, the dry type is intended solely to reduce the air-fuel ratio of the primary air-fuel mixture (to, e.g. about 18:1) by feeding secondary air to the suction manifold. Thus, it places importance on the air-fuel ratio and is capable of decreasing CO contained in exhaust gases but incapable of decreasing the $NO_x$ and HC contents of exhaust gases. Further, classified as the dry type is a suction manifold heating device which does not feed secondary air to the suction manifold but which instead externally heats the suction manifold itself to heat the air-fuel mixture therein, thereby assisting in complete combustion of the mixture so as to suppress the generation of harmful gases contained in exhaust gases. However, since this type of device is intended to evaporate the drops of fuel in the air-fuel mixture by heating the suction manifold, such heating requires so much heat as to make it insufficient to make use of the exhaust gases and cooling hot water as heat source. Therefore, the heater is necessarily large in size and complicated, besides of costing much.

SUMMARY OF THE INVENTION

With the above in mind, a first object of the invention is to provide an exhaust gas suppressor of the dry type which is more practicable than the presently available dry type.

An important object of the invention is to provide an exhaust gas suppressor which, in order to eliminate the drawbacks inherent in the so-called air injection type belonging to the conventional dry type exhaust gas suppressor, heats and expands the air-fuel mixture being fed from the carburetor to the suction manifold, by heated secondary air, decreases the air-fuel ratio as much as possible (to, e.g. about 22:1) and then causes the mixture to eddy by an eddy generating device so as to assist in complete combustion of the fuel-lean mixture, thereby decreasing the CO, $NO_x$ and HC contents of exhaust gases and at the same time greatly decreasing the fuel consumption rate.

Another important object of the invention is to provide an exhaust gas suppressor which is provided with a heater tube capable of making effective use of the heat of exhaust gases in the exhaust manifold to produce heated secondary air efficiently and at low cost.

Another object of the invention is to provide an exhaust gas suppressor which is provided with an air control valve for controlling the amount of heated secondary air to be fed to the suction manifold so that it is in proper relation to the amount of air-fuel mixture prepared by the carburetor.

A further object of the invention is to provide an exhaust gas suppressor which is simple in construction and can be manufactured at low cost.

These and other objects and features of the invention will become more apparent from the following description of embodiments of the invention when read in connection with the accompanying drawings.

BRIEF DESCRIPTION OF THE DRAWINGS

FIG. 1 is an elevational view, partly in section, of an exhaust gas suppressor according to an embodiment of the invention;

FIG. 2 is an enlarged side view showing a heater coil and an attaching ring therefor;

FIG. 3 is a section taken along the line III—III of FIG. 2;

FIG. 4 is an enlarged fragmentary view, partly in section, of a bellows-like tube constituting the heater coil;

FIG. 5 is an enlarged section of an eddy generating device;

FIG. 6 is a perspective view of a first outer plate in the device of FIG. 5;

FIG. 7 is a perspective view of a first inner plate;

FIG. 8 is a perspective view of a second inner plate;

FIG. 9 is a perspective view of a third inner plate;

FIG. 10 is a perspective view of a second inner plate;

FIGS. 11 and 12 are enlarged sections of an air control valve; and

DESCRIPTION OF THE PREFERRED EMBODIMENTS

Figure 12:
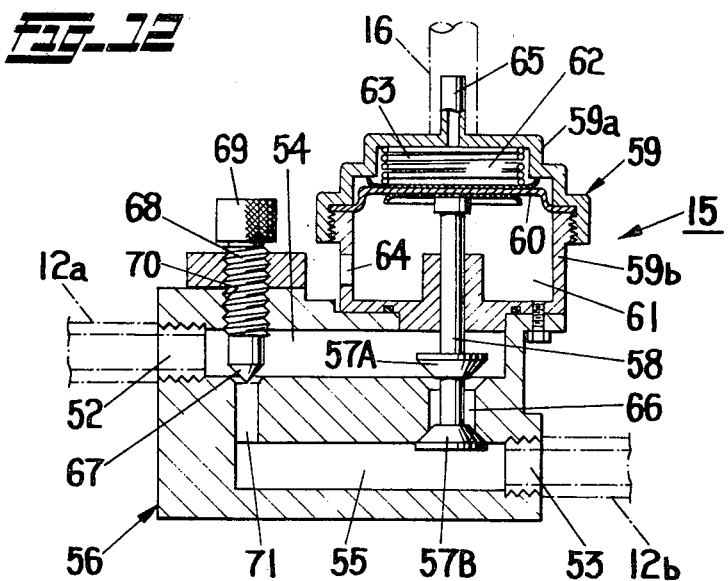

Referring to FIG. 1, the numeral 1 denotes an internal combustion engine body; and 2 denotes a carburetor, on which an air cleaner 3 is mounted and downstream of which is disposed a suction manifold 4. In the carburetor 2, primary air from the air cleaner 3 and fuel from a fuel injection nozzle 5 are mixed to form an air-fuel mixture, which is fed through the suction manifold 4 to the combustion chamber 6 of the engine body 1, the gas burnt there being then discharged as exhaust gases through an exhaust manifold 7. Installed in the exhaust manifold 7 is a coiled heater tube 8, with its ends 9 and 10 projecting outside the exhaust manifold 7. A secondary-air introducing tube 12 has an air filter 11 connected to one end thereof, the other end thereof being connected to one end 9 of said coiled heater tube 8. An eddy generating device 13 is connected to one end of a heated secondary air feed tube 14, the other end thereof being connected to the other end 10 of said heater tube 8. The eddy generating device 13 is disposed between the carburetor 2 and the suction manifold 4 and adapted to impart eddies to the heated secondary air fed from the heated secondary air feed tube 14 and also to the air-fuel mixture fed from the carburetor 2 to the suction manifold 4. Placed between the ends of the secondary air introducing tube 12 is an air control valve 15 which controls the amount of heated secondary air to be supplied to the suction manifold 4 such that it is inversely proportional to the negative suction pressure in the suction manifold 4, the negative pressure side of said air control valve 15 communicating via a negative pressure tube 16 with the suction manifold 4. In FIG. 1, the numeral 17 denotes a conduit which connects the air cleaner 3 to the carburetor 2; 18 denotes the suction valve of the internal combustion engine; 19 denotes the exhaust valve of the engine; and 20 denotes the throttle valve associated with the carburetor.

The coiled heater tube 8, as shown in FIG. 4, is constituted of a single bellows-like metal tube 21 coiled in a double thread screw fashion, as shown in FIG. 2, with its ends 9 and 10 being led to one side of the coil and then extending outwardly of a heater tube attaching ring 22 of metal through holes 23 and 24 formed in the latter. In order to install the coiled heater tube 8, as shown in FIGS. 1 and 2, the exhaust manifold 7 is cut into a tube portion 25 and a manifold main tube portion 26 and flanges 27 and 28 are formed respectively on the opposed cut ends of said tube portions 25 and 26, whereupon the coiled heater tube 8 is inserted into said manifold tube portion 26, and the heater tube attaching ring 22, with the ends 9 and 10 of said heater tube 8 attached thereto, is interposed between the flanges 27 and 28 of said tube portions 25 and 26 with packings (not shown) disposed therebetween, followed by application of bolts 29 and nuts 30 to clamp said ring 8 and flanges 27, 28 together, thereby holding the coiled heater tube 8 in position inside the exhaust manifold 7. One end 9 of the coiled heater tube 8 is connected to the outlet end of the secondary air introducing tube 12, while the other end 10 is connected to the inlet end of the heated secondary air feed tube 14.

The arrangement of the coiled heater tube 8 in which its ends 9 and 10 are led out of one end of the coil has the advantage of facilitating its attachment to the exhaust manifold 7. Further, the facts that the heater tube 8 is constructed in the form of a coil and that it is formed of a bellows-like tube 21, greatly increase the area of contact with exhaust gases. Further, since the heater tube 8 is inserted in the exhaust manifold 7, it is exposed directly to exhaust gases, thus making effective use of the heat of exhaust gases to heat secondary air to high temperature.

The eddy generating device 13, as shown in FIGS. 5-10, comprises a first outer plate 31 which is relatively thick and rectangular, a first inner plate 32 which is relatively thin and oval, a second inner plate 33 which is relatively thin and has the same shape as said first outer plate 31, a third inner plate 34 which is relatively thin and has the same shape as said first outer plate 31, and a second outer plate 35 which is relatively thin and has the same shape as said first outer plate 31. The first outer plate 31 is formed with two circular openings 36 and with an oval groove 37 on its inner side communicating with said openings 36 and adapted to receive said first inner plate 32 and is also formed on one lateral end thereof with a tubular portion 38 communicating with said oval groove 37. As clearly shown in FIG. 6, the first inner plate 32 is adapted to fit in the innermost region of the oval groove 37 of the first outer plate 31 and is formed with openings 39 of the same shape as the openings 36 in the first outer plate 31 in opposed relation to said openings 36, with said openings 39 having a plurality of spaced, elongated triangular fins 40 extending integrally from the respective peripheries thereof radially toward the respective centers of said openings 39, as shown in FIG. 7. The second inner plate 33, as shown in FIG. 8, is formed with upwardly extending cylindrical portions 41 substantially in opposed relation to the openings 36 in the first outer plate 31, with the respective upper ends of said cylindrical portions 41 abutting against the first inner plate 32 fitted in the innermost region of the oval groove 37 of the first outer plate 31, thereby defining an annular groove 50 between the outer peripheral surfaces of the cylindrical portions 41 and the inner peripheral surface of the oval groove 37, said annular groove 50 communicating with the interior of the cylindrical portions 41 through a plurality of communication holes 51 formed in the latter. The third inner plate 34 is disposed under the secondary inner plate 33 and, as shown in FIG. 9, it is formed with openings 42 of the same shape as the openings 36 in the first outer plate 31 in opposed relation to said openings 36, with said openings 42, as in the case of the first inner plate 32, having a plurality of triangular fins 43 extending integrally from the respective peripheries thereof such that when the third inner plate 34 is placed in connection with the first inner plate 32, the fins 43 do not underlie the fins 40 of the plate 32. The fins 43 are wider and shorter than the fins 40 of the first inner plate 32 and are bent at their roots somewhat downwardly. The second outer plate 35, as shown in FIG. 10, is disposed below the third inner plate 34 and on the side opposite to the first outer plate 31 and is formed with downwardly extending frustoconical portions 44 in opposed relation to the openings 36 in the first outer plate 31, said frustoconical portions 44 having a plurality of short triangular fins 45 radially inwardly extending from the respective lower end peripheries thereof. FIG. 5 shows said plates 31, 32, 33, 34 and 35 assembled together to complete the eddy generating device 13. The installation of the device 13 is performed by interposing the device 13 between a flange 46 on the lower end of the carburetor 2 and a flange 47 on the upper end of the suction manifold 4, as shown in FIG. 1, clamping it between said flanges by bolts 48 and nuts 49, and connecting the tubular portion 38 of the first outer plate 31 to the outlet end of the heated secondary air feed tube 14.

The air control valve 15 will now be described. As shown in FIGS. 11 and 12, it comprises a valve attaching base 56 including a first passage 54 and a second passage 55 which have a common inlet 52 and a common outlet 53, said inlet 52 and outlet 53 of said first and second passages 54 and 55 being connected to the inlet and outlet tube portions 12a and 12b of the secondary air introducing tube 12, respectively, a first valve stem 58 disposed in the first passage 54 and having spaced valves 57A and 57B on its lower portion, the upper end of said first valve stem 58 being fixed to a diaphragm 60 installed in a case 59 composed of an upper case 59a and a lower case 59b, said case 59 being partitioned by said diaphragm 60 into an atmospheric pressure chamber 61 and a negative pressure chamber 62, a coil spring 63 disposed in said negative pressure chamber 62 to hold said diaphragm 60 in a fixed position, said atmospheric pressure chamber 61 opening to the atmosphere through an opening 64, said negative pressure chamber 62 communicating with the suction manifold 4 downstream of the carburetor 2 through the negative pressure tube 16 connected to the attaching tube 65 of the upper case 59a, the arrangement being such that the diaphragm 60 is moved under the pressure difference between the atmospheric pressure chamber 61 and the negative pressure chamber 62, whereby the valves 57A and 57B on the first valve stem 58 control the degree of opening of a valve port 66. Thus, when the pressure in the atmospheric pressure chamber 61 is in equilibrium with the pressure in the negative pressure chamber 62 as when the engine is at rest, the diaphragm 60 is held in its fixed position, as shown in FIG. 11, so that the valve 57A closes the valve port 66 to block the first passage; when the negative pressure in the suction manifold 4 is relatively low as when the engine is operating at constant speed or is accelerating, the diaphragm 60 is raised from the fixed position of FIG. 11 to an intermediate position in a predetermined stroke against the force of the coil spring 63, so that the degree of opening of the valve port 66 provided by the valves 57A and 57B is at a maximum and hence the rate of flow of air through the first passage 54 is at a maximum; and when the suction negative pressure in the suction manifold 4 reaches a maximum as when the engine is decelerating, the diaphragm 60 is raised to the upper limit of the predetermined stroke, as shown in FIG. 12 so that the valve 57B closes the valve port 66 to block the first passage 54 and cut off the flow of air through the first passage 54. Further, when the engine is idling or running at low speed, the suction negative pressure in the suction manifold 4 is considerably high, so that the diaphragm 60 is raised close to the upper limit of the stroke, with the valve port 66 being slightly opened by the valve 57B to allow a slight amount of air to flow through the first passage 54. On the other hand, a second valve stem 68 having a valve 67 on its lower end is disposed in the second passage 55. The second valve stem 68 has male threads cut on its peripheral surface and is screwed into a valve stem attaching threaded hole 70 formed in the valve attaching base 56. By turning the head 69 of the valve stem 68 by hand to move said valve stem axially thereof, the valve 67 opens and closes the valve 71 to open and close the second passage 55. Thus, the valve 57 on the first valve stem 58 automatically controls the rate of flow of air through the first passage 54 by the action of the diaphragm 60 responding to the suction negative pressure in the suction manifold 4, while the valve 67 on the second valve stem 68 is manually operable to control the rate of flow of air through the second passage 55. Usually, the valve 67 on the second valve stem 68 is adjusted so as to maintain the second passage 55 at the minimum degree of opening.

Figure 13:
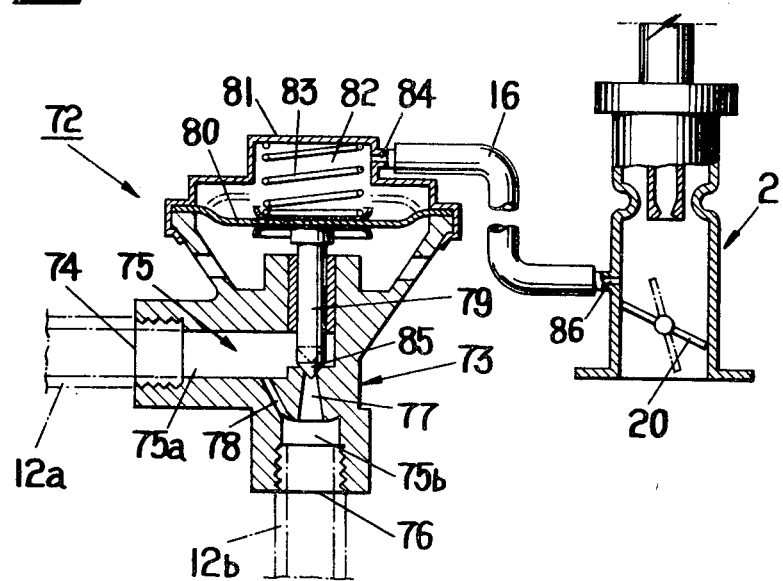
FIG. 13 is a section of another embodiment of an air control valve.

FIG. 13 shows an air control valve 72 according to another embodiment of the invention. It comprises a valve attaching base 73 which includes a transverse passage portion 75a having an inlet 74 and a vertical passage portion 75b having an outlet 76, a valve port 77 provided between said transverse and vertical passage portions 75a and 75b for establishing the communication therebetween, a communication passage 78 leading from said transverse passage portion 75a directly to said vertical passage portion 75b, a valve stem 79 disposed in said transverse passage portion 75a and having a valve 85 formed on the lower end thereof, the upper end of said valve stem 79 being fixed to a diaphragm 80 which cooperates with a casing 81 to define a negative pressure chamber 82, a coiled spring 83 disposed between the diaphragm 80 and casing 81, the communication between the negative pressure chamber 82 and the carburetor 2 being established by a negative pressure tube 16 whose opposite ends are respectively connected to an attaching tube 84 provided in the upper portion of the casing 81 and an attaching tube 86 provided upwardly of the throttle valve 20 associated with the carburetor 2, said inlet 74 and outlet 76 of said passage 75 being connected to the inlet and outlet tube portions 12a and 12b of the secondary air introducing tube 12, respectively. In the operation of the air control valve 72, if the pressure in the negative pressure chamber 82 is equal or nearly equal to atmospheric pressure, the diaphragm 80 is not actuated, so that the valve port 77 remains closed by the valve 85 of the valve stem 79. When the throttle valve 20 is almost closed as when the engine is idling or decelerating, the carburetor 2 is almost at atmospheric pressure and the amount of mixed gas being sucked is small, so that the diaphragm 80 is not actuated. Therefore, because of the closure of the valve port 77, there is no positive supply of secondary air from the inlet tube portion 12a to the outlet tube portion 12b of the secondary air introducing tube 12. Even in such conditions, however, it is so arranged that a constant and small amount of secondary air is being supplied via the communication passage 78. If the degree of opening of the throttle valve increases as when the engine is accelerating or running at constant speed, the amount of mixed gas being sucked into the carburetor 2 increases, with the resulting sucking force upwardly pulling the diaphragm 80 to open the valve port 77, so that the secondary air in the transverse passage portion 75a of the passage 75 flows through the valve port 77 into the vertical passage portion 75b, which means that positive supply of secondary air is effected.

The exhaust gas suppressor constructed in the manner described above operates as follows.

When the engine is idling or running at low speed, there is a considerably high suction negative pressure produced in the suction manifold 4, with the result that secondary air flows from the air filter 11 successively through the secondary air introducing tube 12, the coiled heater tube 8, the heated secondary air feed tube 14 and the eddy generating device 13 into the suction manifold 4. In this case, the secondary air being fed from the introducing tube 12 to the coiled heater tube 8 is heated to about 600° C. by the heat of exhaust gases in the exhaust manifold 7 when flowing through the coiled heater tube 8. Since the coiled heater tube 8 is placed in the exhaust manifold 7, the exhaust gases come in direct contact with the heater tube. Further, since the heater tube 8 is in a coil form and fabricated of a bellows-like tube, it has a much greater area of contact than a simple round tube. Thus, there is a great merit that secondary air flowing through the heater tube 8 can be extremely efficiently heated to high temperature. The secondary air heated to high temperature by the coiled heater tube 8 is introduced through the feed tube 14 and then through the tubular portion 38 of the eddy generating device 13 into the annular groove 50. The heated secondary air introduced into the annular groove 50 is blown, in the state of a hot blast, through the communication holes 51 in the cylindrical portions 41 of the second inner plate 33 into the cylindrical portions 41. The temperature of the hot blast is 500° C. On the other hand, a mixture of fuel and primary air prepared in the carburetor 2 is drawn into the suction manifold 4 through the eddy generating device 13 by the suction negative pressure. In this case, the mixed gas (with an air-fuel ratio of about 15:1) introduced into the eddy generating device 13 through the openings 36 in the first outer plate 31 meets the heated secondary air, namely, hot blast blown in through the communication holes 51 in the second inner plate 33 and is heated by the hot blast and expanded to become fuel-lean until the air-fuel ratio is about 22:1 while it is caused to eddy successively by the elongated triangular fins 40 of the first inner plate 32, the triangular fins 43 of the third inner plate 34 and the triangular fins 45 of the second outer plate 35, whereby said mixed gas is completely gasified, with no portion thereof left ungasified. Since the mixed gas, though leaned to the extent of having an air-fuel ratio of about 22:1, has been heated to high temperature by the heated secondary air and completely gasified by being eddied, it can be easily exploded for complete combustion in the engine. As a result, the CO, $NO_x$ and HC contents of exhaust gases produced by combustion are at a minimum and at the same time the consumption of fuel can be greatly reduced. Further, the amount of heated secondary air to be fed to the suction manifold 4 is automatically controlled by the air control valve 15 so that it is inversely proportional to the suction negative pressure in the suction manifold 4. Thus, when the suction negative pressure is relatively high as when the engine is idling or running at low speed, a small amount of heated secondary air is fed; when the suction negative pressure is relatively low as when the engine is running at constant speed or accelerating, a large amount of heated secondary air is fed; and when the suction negative pressure is at a maximum as when the engine is decelerating, the supply of heated secondary air is reduced to a minimum or zero. Therefore, it follows that heated secondary air is supplied in proportion to the amount of mixed gas prepared by the carburetor and that, as a result, the air-fuel ratio of the lean gas fed through the suction manifold to the engine is maintained constant, so that irrespective of the operating condition of the engine, the gas inside the engine can be burnt completely, thereby making it possible to minimize the amount of harmful gases and save fuel consumption. The present exhaust gas suppressor is simple in the arrangement for heating secondary air and is easier to install and less expensive than the conventional exhaust gas suppressor.

What is claimed is:

1. An exhaust gas suppressor for internal combustion engines, comprising, a coiled heater tube formed of a metal tube in the form of a bellows, the ends of which extend outwardly through the exhaust manifold for heating secondary air by the heat of exhaust gases in said manifold and are inserted in holes in a heater tube attaching ring which is hermetically sealed and removably installed in a required place in the exhaust manifold, a secondary air introducing tube having an air filter on one end thereof opening to the atmosphere and connected at the other end thereof to one end of said heater tube, a heated secondary air feed tube connected at one end thereof to the other end of said heater tube and communicating at the other end thereof with the suction manifold for supplying secondary air heated by said heater tube to a mixture of primary air and fuel prepared by the carburetor, an eddy generating device disposed in the suction manifold and connected to the other end of said heated secondary air feed tube for eddying said primary air-fuel mixture and heated secondary air added thereto, and an air control valve placed between the ends of said secondary air introducing tube for controlling the amount of heated secondary air to be supplied in relation to the amount of said mixed gas.

2. An exhaust gas suppressor as set forth in claim 1, wherein said eddy generating device comprises an outer plate and two inner plates, said outer plate having a plurality of circular openings formed in the upper surface thereof and an oval groove formed in the lower surface thereof and also having a tubular portion formed on one lateral side thereof which communicates with said oval groove, one inner plate having upwardly extending cylindrical portions opposed to said openings in said outer plate, said cylindrical portions being fitted in said oval groove in said outer plate to define an annular groove between said cylindrical portions and said oval groove, said annular groove communicating with the interiors of said cylindrical portions through a plurality of communication holes formed in said cylindrical portions, the other inner plate having openings of substantially the same shape as said openings in said outer plate in opposed relation to the latter, said openings in said other inner plate each having a plurality of triangular fins extending from the peripheral edge thereof.

3. An exhaust gas suppressor as set forth in claim 2, including another inner plate disposed between said outer plate and said one inner plate, said another inner plate having openings of the same shape as the openings in said outer plate in opposed relation to the latter, said openings in said another inner plate each having a plurality of elongated triangular spaced fins extending from the peripheral edge thereof radially toward the center of the opening, and another outer plate disposed below said other inner plate and having downwardly extending frustoconical portions at positions corresponding to the openings in said outer plate, said frustoconical portions each having a plurality of short triangular fins extending radially inwardly from the peripheral edge of the lower end thereof.

4. An exhaust gas suppressor as set forth in claim 3, wherein said air control valve includes a valve attaching base having a passage communicating with the secondary air introducing tube, said passage having disposed therein a valve stem having two spaced valves on its lower end, the upper end of said valve stem being fixed to a diaphragm installed in a case attached to said base, said case being internally partitioned into an atmospheric pressure chamber and a negative pressure chamber by said diaphragm, said atmospheric pressure chamber opening to the atmosphere, said negative pressure chamber communicating with the suction manifold through a negative pressure tube, the arrangement being such that said diaphragm is displaceable in response to the negative suction pressure in the suction manifold, thus moving the valve stem to control the degree of opening of the valve port of said passage by said two valves on said valve stem.

5. An exhaust gas suppressor as set forth in claim 4, wherein said valve attaching base is provided with a second passage having an inlet and an outlet in common with said first passage, said second passage having installed therein a second valve stem having a valve on its front end, said second valve stem being screwed into said base so that it may be manually turned for axial movement so as to control the degree of opening of the valve port of the second passage by the valve of said second valve stem.

6. An exhaust gas suppressor as set forth in claim 1, wherein said air control valve comprises a valve attaching base having a passage communicating with the secondary air introducing tube, a valve stem disposed in said passage and having a valve for opening and closing the valve port of said passage, the upper end of said valve stem being fixed to a diaphragm which defines a negative pressure chamber communicating with the carburetor through a negative pressure tube so that the diaphragm is actuated in relation to the amount of suction of mixed gas in the carburetor to thereby control the degree of opening of the valve port by said valve, and a communication passage which establishes the communication between the inlet portion and outlet portion of said passage so that a constant and small amount of secondary air is flowing through said communication passage into said passage at all times.

* * * * *

UNITED STATES PATENT OFFICE
CERTIFICATE OF CORRECTION

Patent No. 4,362,143　　　　　　　　Dated December 7, 1982

Inventor(s) Masafumi Fukumoto

It is certified that error appears in the above-identified patent and that said Letters Patent are hereby corrected as shown below:

Column 2, line 53, change "second inner plate", to
　　　　　　-- second outer plate --.

Column 4, line 32, change "secondary", to -- second --.

Signed and Sealed this

Fifteenth Day of March 1983

[SEAL]

Attest:

GERALD J. MOSSINGHOFF

Attesting Officer　　Commissioner of Patents and Trademarks